United States Patent [19]
Mark et al.

[11] 3,869,491

[45] Mar. 4, 1975

[54] HALOSULFONYL SULFOOXONIUM COMPOUNDS

[75] Inventors: Victor Mark; Carol A. Mark, both of Ransomville, N.Y.

[73] Assignee: Hooker Chemicals & Plastics Corp., Niagara Falls, N.Y.

[22] Filed: Mar. 10, 1971

[21] Appl. No.: 123,015

[52] U.S. Cl. ............................. 260/457, 260/599
[51] Int. Cl. ........................................ C07c 141/00
[58] Field of Search ....... 260/458, 456, 599, 618 D, 260/457

[56] References Cited
UNITED STATES PATENTS

| | | | |
|---|---|---|---|
| 1,931,203 | 10/1933 | Meerwern et al. | 260/618 D |
| 2,621,168 | 12/1952 | Ross et al. | 260/77.5 AM |
| 3,146,086 | 8/1964 | Bluestone et al. | 260/599 |
| 3,300,515 | 1/1967 | Baird et al. | 260/458 X |

FOREIGN PATENTS OR APPLICATIONS

| | | | |
|---|---|---|---|
| 1,135,120 | 11/1968 | Great Britain | 260/599 |

*Primary Examiner*—Leon Zitver
*Assistant Examiner*—Norman Morgenstern
*Attorney, Agent, or Firm*—Peter F. Casella; Donald C. Studley; William J. Crossetta, Jr.

[57] ABSTRACT

Polyhaloaralkyl (halosulfonyl) sulfooxonium inner salts are prepared by the reaction of benzal halides with sulfur trioxide. The oxonium salts are readily hydrolyzed to afford aldehydes useful in the production of flame retardant polymers. The aldehyde products of oxonium salt hydrolysis may be oxidized to the corresponding carboxylic acid derivatives which are useful pesticides.

10 Claims, No Drawings

HALOSULFONYL SULFOOXONIUM COMPOUNDS

This invention relates to a novel class of halogenated organic disulfooxonium compounds and to methods for their synthesis. It relates in particular to geminal bis(-halosulfonyl) and halo(halosulfonyl) oxonium compounds, which are uniquely suitable for the preparation of a variety of halogenated, aldehydic and carboxylic acid containing products which are useful as precursors for halogenated polymers, as flame retardant additives for polymers, and as pesticides.

The new class of compounds may be represented by the following general formula:

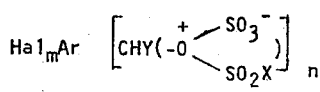

wherein:
Ar is an aromatic nucleus;
Hal is a halogen selected from the group consisting of fluorine, chlorine, bromine and iodine;
X is a halogen comprising fluorine, chlorine and bromine;
Y is selected from the group consisting of X and

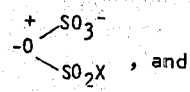, and $m$ and $n$ are integers so selected that their sum is the number of substitutable positions available on the aromatic ring, which, when Ar is benzene is 6, when naphthalene is 8 and when anthracene and phenanthrene is 10.

The aromatic nucleus Ar is intended for the purposes of this disclosure to embrace the ring structures of benzene, naphthalene, anthracene and phenanthrene. Thus Ar is an aromatic hydrocarbon moiety of the benzene series containing from 1 to 4 six membered rings in which each substitutable hydrogen on the ring has been replaced by a halogen.

The new compounds are prepared from compounds of the structure $$Hal_m Ar(CHX_2)_n$$

wherein Ar, Hal, X, $m$ and $n$ are as defined above, using sulfur trioxide, in neat form or in solution, as the second reactant.

The following chemical equations illustrate some of these novel chemical reactions:

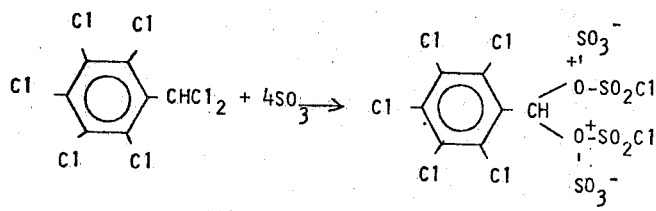

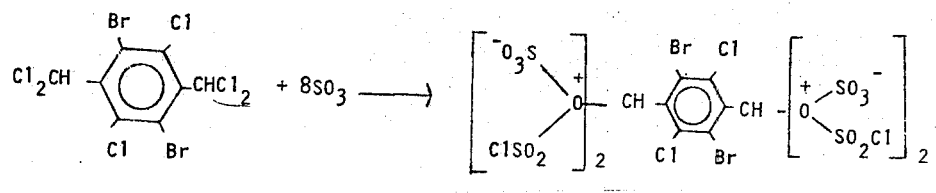

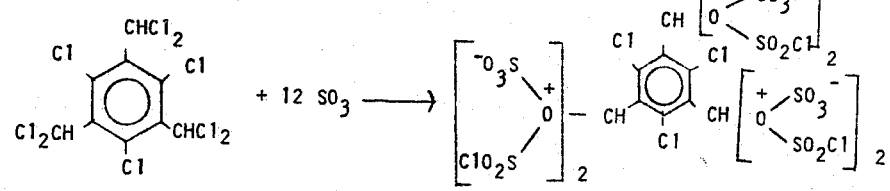

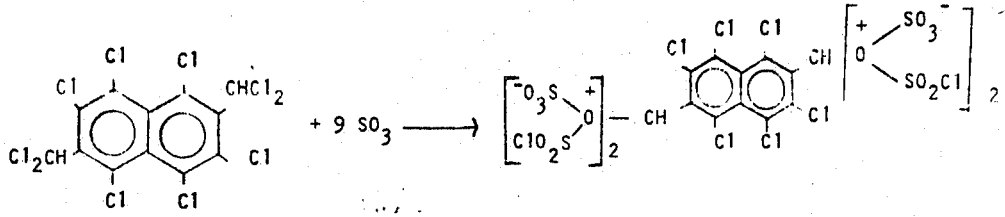

The rather wide scope of these reactions is indicated by the variety of halogenated aromatic substrates which readily undergo these insertion reactions. Derivatives of all four of the common halogens are equally suitable as starting materials if they are substituted on mono-, di- and polynuclear aromatic compounds. All of these aromatic nuclei carry one or more side chains consisting of the difluoromethyl, chlorofluoromethyl, dichloromethyl, fluorobromomethyl, chlorobromomethyl and dibromomethyl substituents.

As representatives of the multitude of polyhalo aromatic substrates covered by this invention the following compounds can be cited: α,α-dichloro-2,3,4,5,6-pentafluorotoluene,α,α,2,3,4,5,6-heptachlorotoluene, 2,3,4,5,6-pentabromo-α,α-dichlorotoluene, 2,3,4,5,6-pentachloroα,α-difluorotoluene, α,2,3,4,5,6-hexachloro-α-fluorotoluene,α,α,α′, α′,2,3,5,6-octachloro-p-xylene,α,α,α′,α′,2,4,5,6-octachloro-m-xylene, α,α,α′,α′,3,4,5,6-octachloro-o-xylene, α,α,α′, α′,α″,α″,2,4,6-nonachloromesitylene,α1,3,5,7-tetrabromo-α,α,α′,α′-tetrachloro-2,6-dimethylnaphthalene, α,α,α′,α′,1,2,3,4,5,6,7,8-dodecachloro-9,10-dimethyl anthracene, 2,3,4,5-tetrabromo-α,α-dichloro-6-iodotoluene.

The sulfur trioxide reactant can be used in neat form or in solution. Liquid, stabilized sulfur trioxide, which as a boiling point of 44.5°C., is the preferred form of this reagent, since it has excellent solvent properties and, due to its low boiling point, any excess of it available at the end of the reaction can readily be recovered by distillation. Solutions of sulfur trioxide, especially in sulfuric acid, known as fuming sulfuric acid or oleum, and in other non-reactive solvents, such as trichlorofluoromethane, trichlorofluoroethane, difluorotetrachloroethane, can also be employed. The reactions are carried out usually at atmospheric pressure, since not much benefit can be derived by decreasing or increasing the pressure during the reaction. For the quantitative recovery of the excess of sulfur trioxide, vacuum can be applied at the end of the reaction in order to reduce the temperature at which the reaction mixture is heated and thus to preserve the product without thermal decomposition. The temperature range in which these reactions are carried out is most often at and above room temperature, usually between 20° and 60°C, but it can be both lower and higher than this range, depending mostly on the nature of the dihalomethyl moiety and the solubility characteristics of the reactant in the sulfur trioxide medium. Thus, with not very soluble reactants the use of higher than atmospheric pressure is advantageous in order to secure a higher reaction temperature than that realized by the refluxing sulfur trioxide at atmospheric pressure. Higher temperature can also be secured by using fuming sulfuric acid as a reactant, especially in a closed system, whereby up to 150°C can be employed without loss of appreciable amounts of $SO_3$.

The new chemical compounds represent a new class of organosulfur derivatives and display highly characteristic physical and chemical properties. Due to their highly reactive nature, identification and characterization is carried out best via proton nuclear magnetic resonance spectroscopy and it is detailed in the specific examples. A quantitative analysis is feasible based on the quantitative nature of the reaction leading to both their formation and their subsequent hydrolysis to products. It is the latter aspect that renders these compounds of great synthetic value: they are hydrolyzed quantitatively to the corresponding aromatic aldehydes by the following stoichiometry:

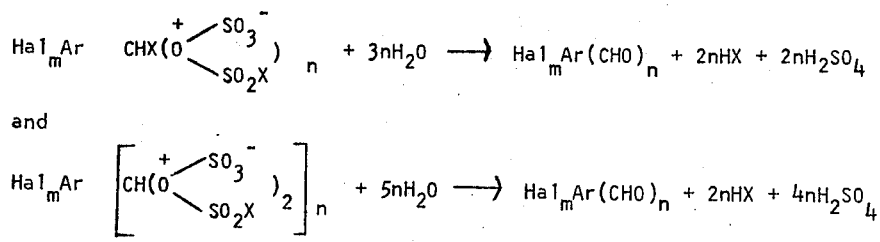

Since these reactions are quantitative, the inorganic hydrolysis products are determined by appropriate titrations and spectral and gravimetric analyses, and the aromatic aldehydes are analyzed by both spectral and elemental (combustion) analyses.

The often ready availability of the polyhalo starting materials, the facility of the reaction under mild synthetic conditions and the usually quantitative yields render these reactions of unique synthetic value.

The resultant mono-, di-, and polyhaloaromatic aldehydes are useful directly as chemical intermediates and as monomers for the preparation of polymeric systems, such as those with the Schiffbase structure, as well as indirectly after their transformations into the corresponding alcohols and acids and acid chlorides and the numerous, well known derivatives of aromatic aldehydes.

The new aromatic derivatives of sulfur trioxide and the insertion reactions yielding them are shown in the following examples, which are intended solely for purposes of illustration and are not to be construed in any way limiting the scope of this invention.

EXAMPLE 1

Preparation of α,2,3,4,5,6-hexachlorobenzyl)chlorosulfonyl)-sulfooxonium hydroxide inner salt, (A) and of 2,3,4,5,6-pentachlorobenzalbis [(chlorosulfonyl)sulfooxonium] dihydroxide bis [inner salt],

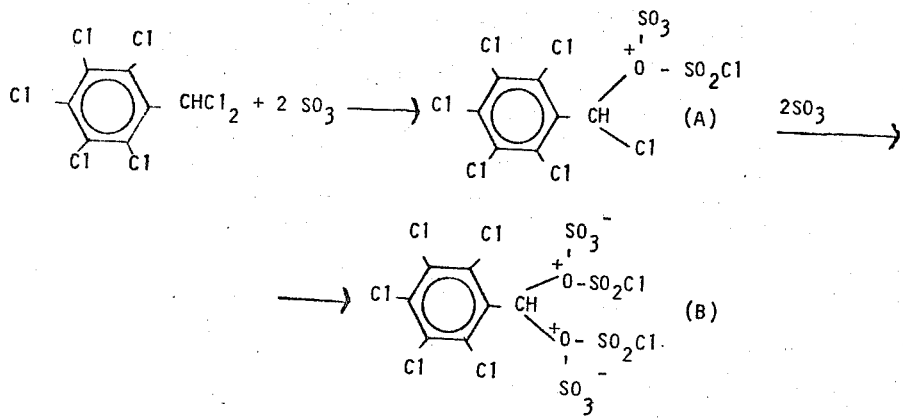

To a 500 ml 3-neck, tared flask, provided with stirrer, thermometer and reflux condenser the end of which was attached to a bubble counter, there was charged 240 g (3.0 mole) of fresh liquid sulfur trioxide. With stirring there was added, in small portions, through a wide extension tube attached to one of the necks of the flask, 33.3 g (0.1 mole) of pure α,α,2,3,4,5,6-heptachlorotoluene, mp. 118°–119°C. There was, at room temperature, an immediate development of a red color, which persisted during the entire addition period of the benzal chloride, which was carried out in about 15 minutes, but faded out gradually as the reaction progressed. There was no significant temperature change from room temperature during the addition and no gas evolution was observed. The progress of the reaction was monitored best by nuclear magnetic resonance, run directly on the sulfur trioxide solutions, which showed that the single peak due to the starting material diminished gradually, giving rise to a new peak at 8.35 ppm and, as the reaction progressed, to a second one at 9.31 ppm. The former nuclear magnetic resonance peak is due to product (A), whereas the low field peak represents compound (B). The gross structure of the latter was confirmed also, by its isolation in neat form after the distillation and stripping of the excess of sulfur trioxide, which yielded 66.6 g of a dark orange brown solid, corresponding to the composition of $C_7HCl_7O_{12}S_4$. Confirmation for structure (B), indicated in the title equation, was obtained by its hydrolysis which yielded the theoretical amount of pentachlorobenzaldehyde, hydrochloric and sulfuric acids, as detailed in Example 7.

EXAMPLE 2

Preparation of 2,3,5,6-tetrachloro(p-phenylenedimethine) tetrakis[(chlorosulfonyl)sulfooxonium] tetrahydroxide tetrakis [inner salt], (C):

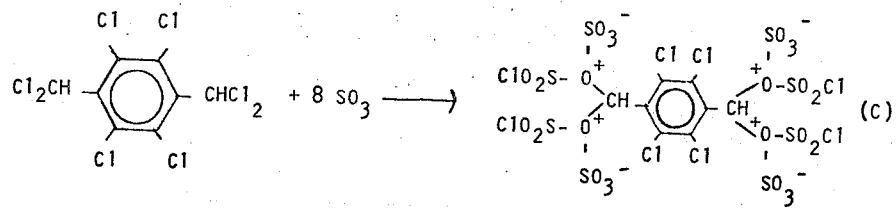

The procedure of Example 1 was exactly repeated, except that 38.2 g (0.1 mole) of α,α,α',α',2,3,5,6-octachloro-p-xylene, mp 124°–126°C, was substituted for heptachlorotoluene. There was obtained 100.6 g of mustard colored residue, whose composition corresponds to $C_8H_2Cl_8O_{24}S_8$. The product was hydrolyzed quantitatively to tetrachloroterephthaladehyde, four moles of hydrochloric and eight moles of sulfuric acid, as described in Example 9.

EXAMPLE 3

Preparation of 2,4,5,6-tetrachloro(m-phenylenedimethine) tetrakis [(chlorosulfonyl)sulfooxonium] tetrahydroxide tetrakis [inner salt], (D):

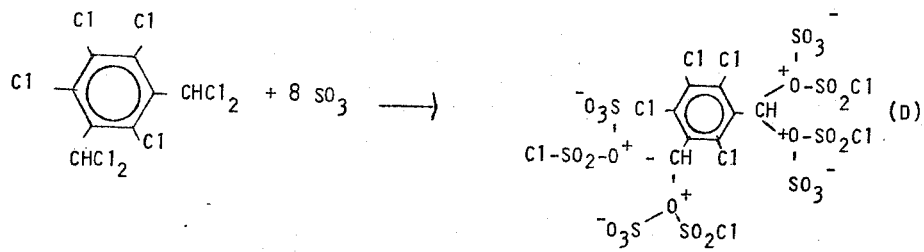

Repeating the procedure of Example 1 with the substitution of 38.2 g of α,α,α',α',2,4,5,6-octachloro-m-xylene, mp 100°–101°, for the heptachlorotoluene resulted in the formation of the title compound (D) in quantitative yield (101.2 g). Its structure was confirmed by the quantitative analysis of its hydrolysis products as detailed in Example 10.

EXAMPLE 4

Preparation of 3,4,5,6-tetrachloro(o-phenylenedimethine) tetrakis [(chlorosulfonyl)sulfooxonium] tetrahydroxide tetrakis [inner salt], (E).

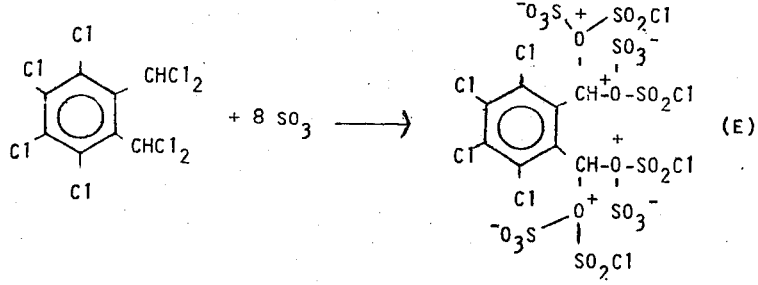

When the procedure of Example 1 was repeated the substitution of 38.2 g of α,α,α′,α′,3,4,5,6-octachloro-o-xylene, mp 148°–150°C, for the heptachlorotoluene, there was obtained a deep red-brown syrup, 100.8 g, identified as the title compound by the stoichiometry of its formation as well as by the quantitative elemental analysis of its hydrolysis products, which contained the theoretical amount of hydrochloric and sulfuric acids.

EXAMPLE 5

Preparation of 2,4,6-trichloro [s-phenyltris(methine)] hexakis [(chlorosulfonyl)sulfooxonium] hexahydroxide hexakis [inner salt], (F).

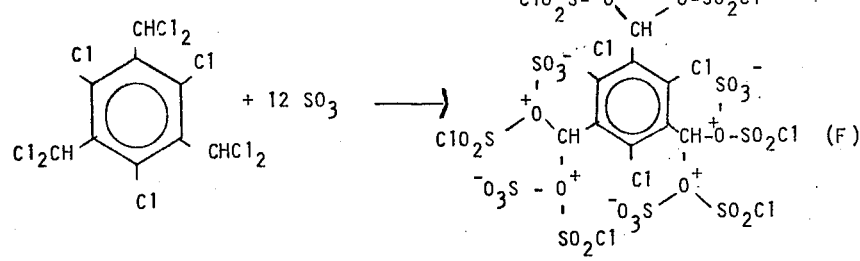

The procedure of Example 1 was repeated, except that 43.0 g (0.1 mole) of α,α,α′,α′,α″,α″,2,4,6-nonachloromesitylene, mp 178°–180°C, was substituted for the heptachlorotoluene. The title compound, (F) was obtained quantitatively, in 139 g of yield, after the excess of sulfur trioxide was eliminated, and was hydrolyzed in high yield to the corresponding trialdehyde, as described in Example 11.

EXAMPLE 6

Preparation of 2,3,4,5-tetrabromo-6-chlorobenzalbis [(chlorosulfonyl)sulfooxonium] dihydroxide bis [inner salt], (G).

The procedure of Example 1 was repeated with the substitution of 2,3,4,5-tetrabromo-α,α,6-trichlorotoluene for the heptachlorotoluene. A nearly quantitative yield of the bisoxonium compound was obtained.

EXAMPLE 7

Preparation of pentachlorobenzaldehyde.

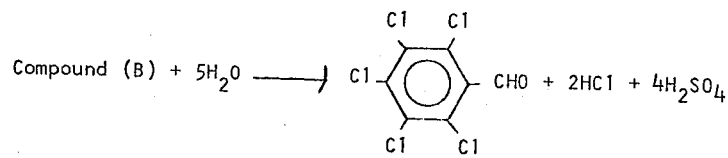

The residue 66.6 g of the sulfur trioxide stripping of Example 1 was added with good stirring to 1000 g of ice-water and the resultant light, cream color precipitate was filtered, washed thoroughly with water until it became essentially acid free and was dried in air. Since the weight of the product after two days at room temperature was slightly more (29.4 g) than the theoretical, (27.8 g) it was refluxed with benzene and the water was removed azeotropically. There was obtained 1.5 g of water. The benzene solution, which contained a small amount of a brown, flocculent material was treated with charcoal, filtered and stripped, leaving behind 27.5 g of the pure aldehyde, mp 198°–200°C. Its purity and identity was confirmed by mixed melting point (undepressed) with an authentic sample, spectroscopically and by elemental analysis. Its nuclear magnetic resonance spectrum displayed the single aldehy-

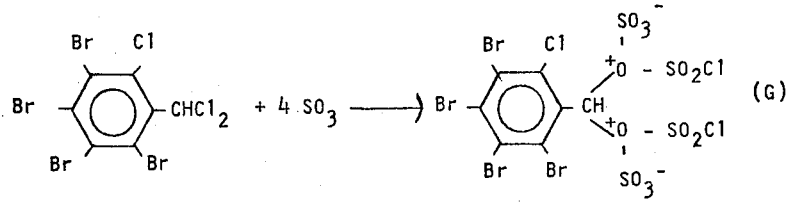

dic proton at 10.28 ppm in deuteriochloroform solution, (at 10.22 ppm in dimethylsulfoxide solution, and at 9.60 ppm in deuteriobenzene solution) and its infrared spectrum, run in perchloroethylene and carbon disulfide solution, featured maxima at 3395, 2950, 1720, 1528, 1364, 1348, 1310, 1232, 1218, 1190, 1128, 947, 790, 692, 677, 659 and 522 cm⁻¹.

Calculated for $C_7HCl_5O$: C, 30.20; H, 0.36; Cl, 63.69%.

Found: C, 30.0; H, 0.3; Cl, 63.5%.

Analysis of the inorganic coproducts was carried out by titrimetric and gravimetric determinations on the aqueous phase. The presence of 0.2 mole of hydrochloric acid and 0.4 mole of sulfuric acid was established in the water extracts of the aldehyde.

EXAMPLE 8

Preparation of 2,3,4,5-tetrabromo-6-chlorobenzaldehyde.

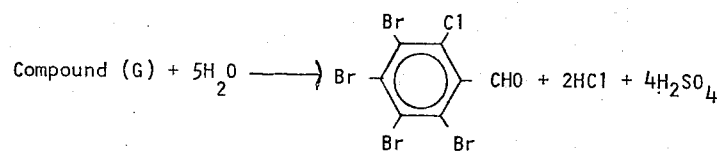

When the procedure of Example 7 was repeated with compound (G) in place of (B) there was obtained an essentially quantitative yield of the title compound.

EXAMPLE 9

Preparation of tetrachloroterephthalaldehyde.

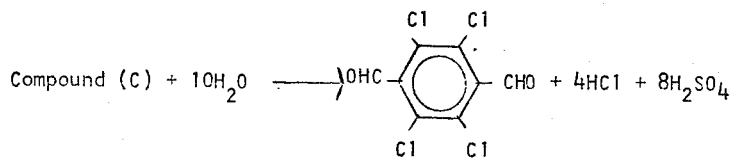

The procedure of Example 7 was repeated with compound (C) instead of (B). There was obtained a quantitative yield of the title compound, mp 193°C. Its nuclear magnetic resonance spectrum consisted of a single peak at 10.34 ppm in deuteriochloroform solution and its infrared spectrum featured maxima at 2850, 1720, 1340, 1147, 977, 840, 724, 695, 615, 604 and 488 cm⁻¹, run in Nujol mull.

EXAMPLE 10

Preparation of tetrachloroisophthalaldehyde.

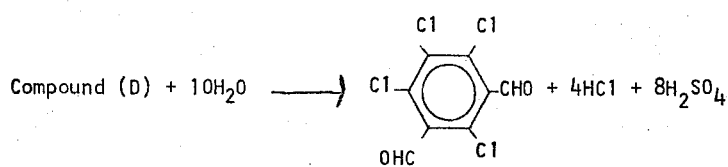

Repeating the procedure of Example 7 with compound (D) resulted in the quantitative formulation of ppm. title compound, mp 197°C, whose nuclear magnetic resonance spectrum showed a singlet at 10.36 pm.

EXAMPLE 11

Preparation of 2,4,6-trichlorobenzene-1,3,5-tricarboxaldehyde.

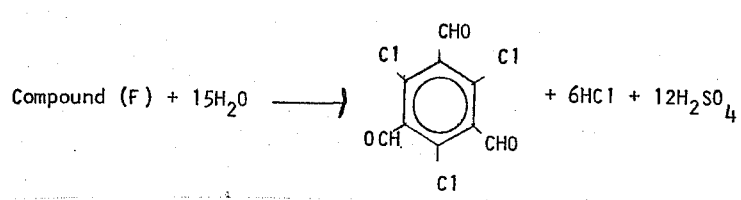

Repeating the procedure of Example 7 with the substitution of compound (F) for compound (B) yielded the title compound, mp 184°–186°C, in 90% conversion. Its nuclear magnetic resonance spectrum, run in deuteriochloroform solution, was a singlet at 10.39 ppm and its infrared spectrum displayed maxima at 3420, 2890, 1725, 1550, 1252, 1172, 993, 958, 720, 540, 520 and 464 cm⁻¹, obtained as a mull in mineral oil Calculated for $C_9H_3Cl_3O_3$: C, 40.90; H, 1.1; Cl, 40.1%.

Found C, 40.8; H, 1.3; Cl, 39.0%.

What is claimed is:
1. A compound of the formula

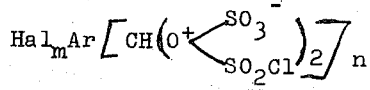

wherein Ar is benzene, Hal is independently selected from the group consisting of fluorine, chlorine, bromine and iodine, $n$ is an integer selected from the group consisting of 1, 2 and 3 and $m+n$ is 6.

2. The compound of claim 1 of the formula

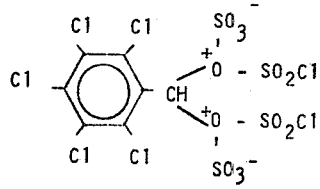

3. The compound of claim 1 of the formula

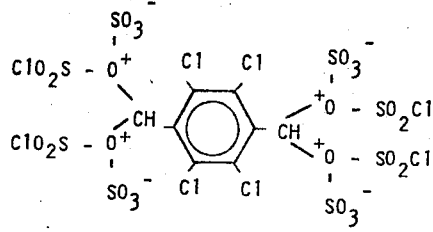

4. The compound of claim 1 of the formula

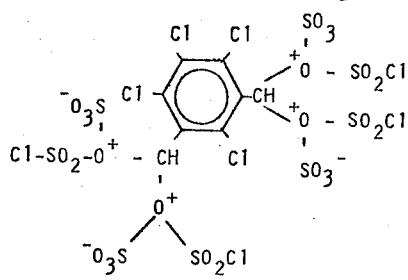

5. The compound of claim 1 of the formula

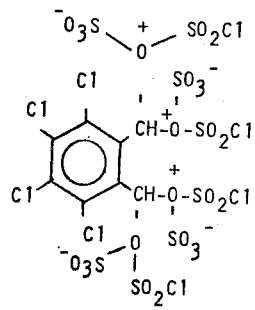

6. The compound of claim 1 of the formula

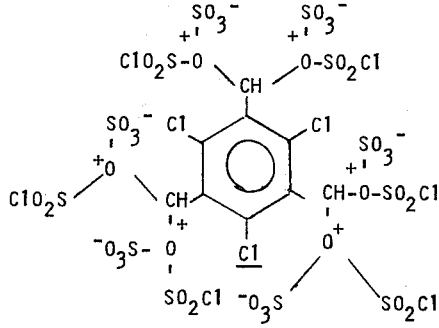

7. The compound of claim 1 of the formula

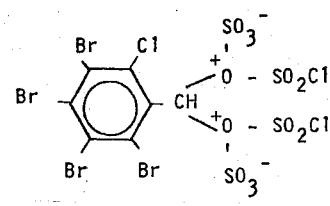

8. A process for making a compound of the formula

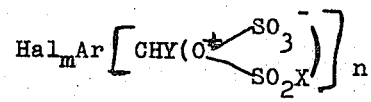

which comprises reacting sulfur trioxide with a compound of the formula $$Hal_mAr(CHX_2)_n$$

wherein
Ar is an aromatic nucleus selected from the group consisting of benzene, naphthalene, anthracene and phenanthrene;
Hal is a halogen selected from the group consisting of fluorine, chlorine, bromine and iodine;
X is a halogen comprising fluorine, chlorine and bromine;
Y is a substituent selected from the group consisting of X and

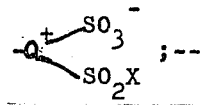

$m$ and $n$ are integers so selected that their sum is the number of substitutable positions available on the aromatic ring, which, when Ar is benzene is 6, when naphthalene is 8 and when anthracene and phenanthrene is 10.

9. The process of claim 8 wherein an excess of neat, liquid sulfur trioxide is the reactant.

10. The process of claim 8 in which the sulfur trioxide reactant is employed in a diluent selected from the group consisting of sulfuric acid and a perhaloalkane.

* * * * *